United States Patent [19]
Seibold et al.

[11] 3,735,997
[45] May 29, 1973

[54] GOLF CART

[75] Inventors: Paul F. Seibold, Huntington Woods, Mich.; Alfred H. Haberstump, Detroit, Mich.

[73] Assignee: said Seibold, by said Haberstump

[22] Filed: Nov. 24, 1971

[21] Appl. No.: 198,005

Related U.S. Application Data

[63] Continuation of Ser. No. 10,488, Feb. 11, 1970, abandoned.

[52] U.S. Cl. ............................ 280/36 C, 280/DIG. 6
[51] Int. Cl. .................................................. B62b 11/00
[58] Field of Search ................... 280/40, 36 C, 41 C, 280/36 R, 36 B, 41 D, DIG. 6, 47, 37 R; 297/16, 17, 42, 51; 248/96

[56] References Cited

UNITED STATES PATENTS

| R26,536 | 3/1969 | Dawson | 280/41 C |
| 2,471,751 | 5/1949 | Hutsell | 280/DIG. 6 |

FOREIGN PATENTS OR APPLICATIONS

| 996,730 | 6/1965 | Great Britain | 280/DIG. 6 |

*Primary Examiner*—Leo Friaglia
*Assistant Examiner*—Robert R. Song
*Attorney*—Harness, Dickey & Pierce

[57] ABSTRACT

The golf cart embodies a seat having a tubular frame on each side which is pivoted to the side edges of the seat and so formed as to have golf carrying bags releasably secured to opposite sides thereof. The top inner side of the bag is secured to the top outer face of the frames and the bottom outer side of the bags is secured to the bottom inner face of the frames with the bags disposed in parallel planes at an angle of approximately 45°.

9 Claims, 9 Drawing Figures

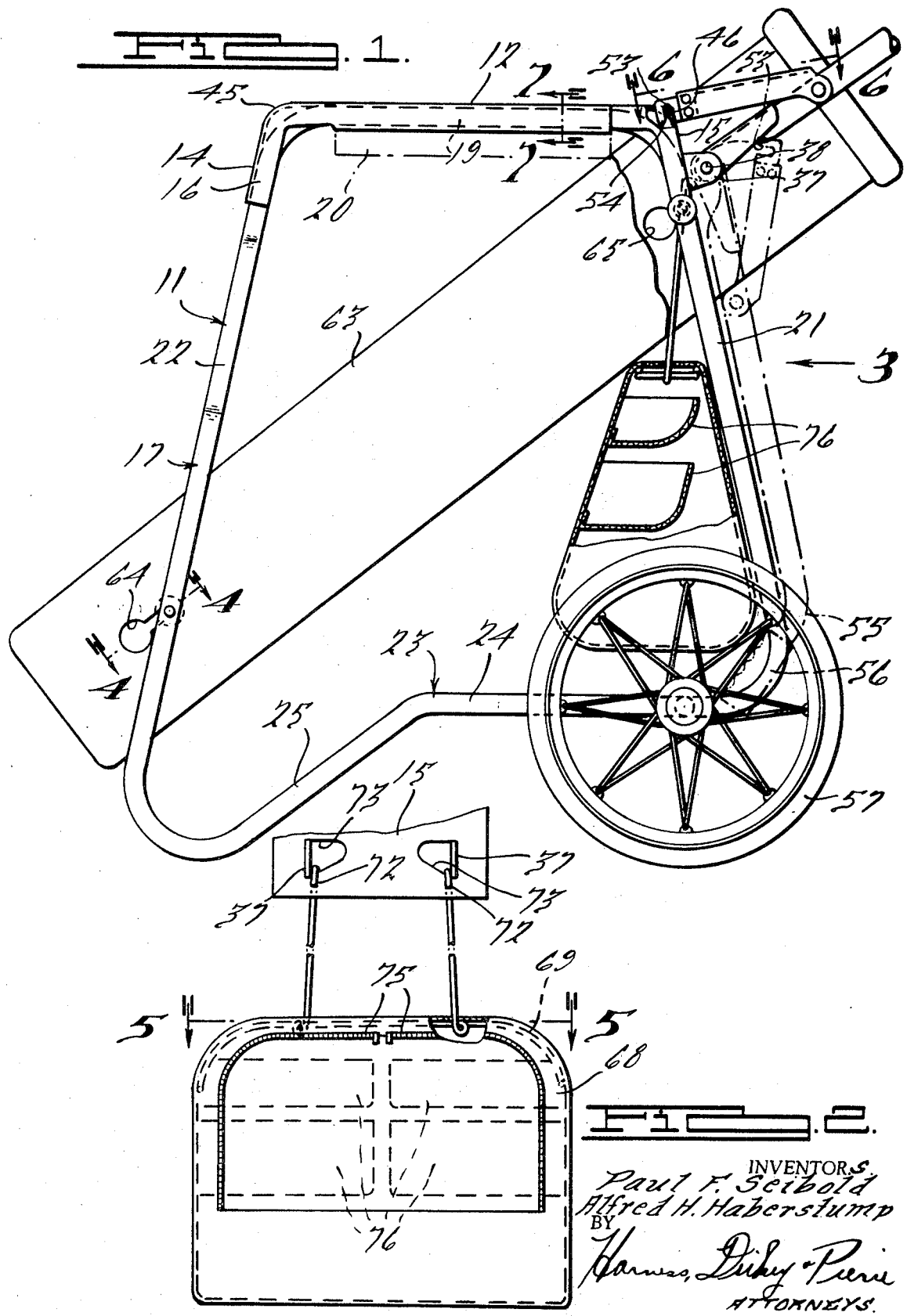

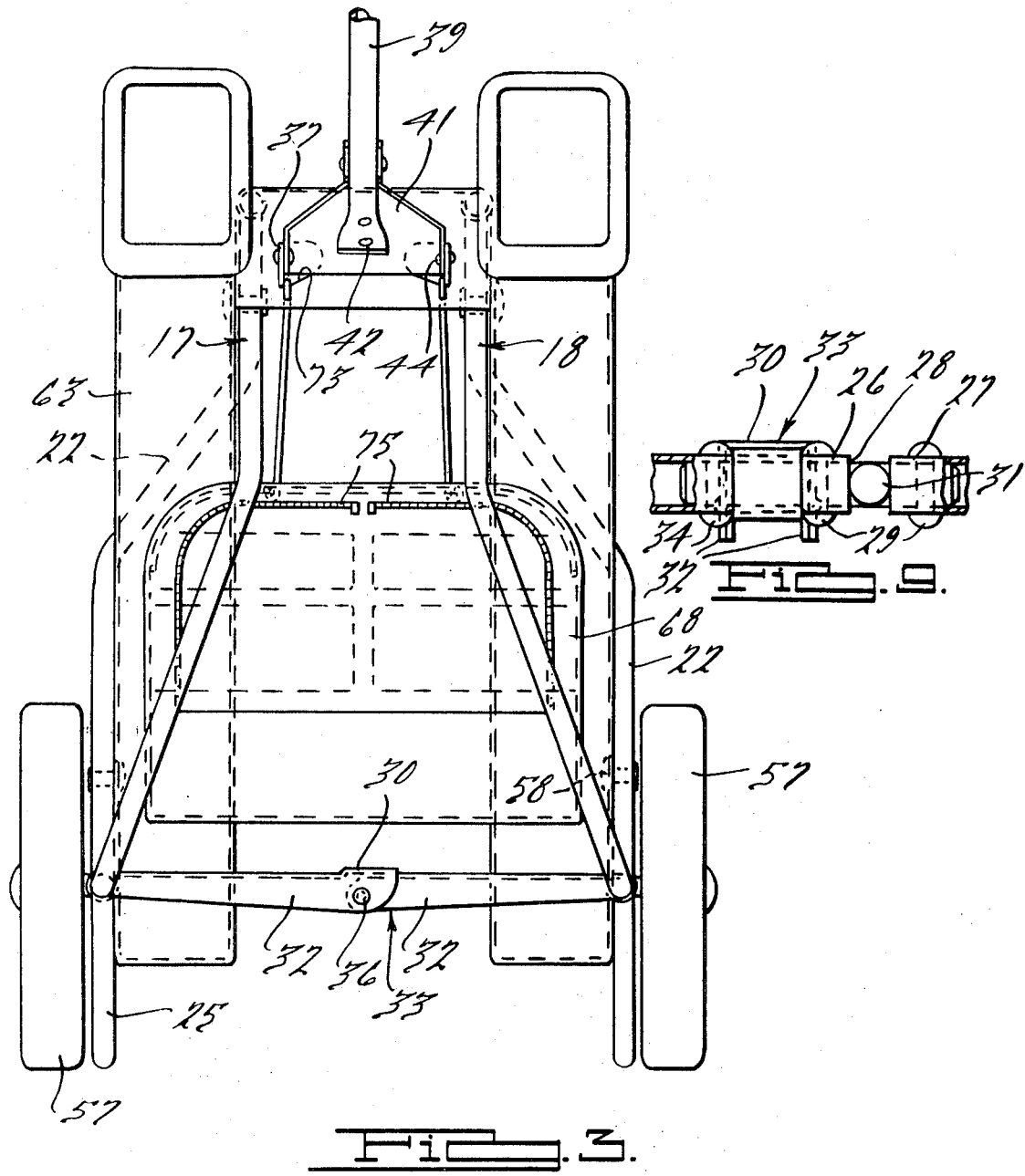

Patented May 29, 1973
3,735,997
3 Sheets-Sheet 3
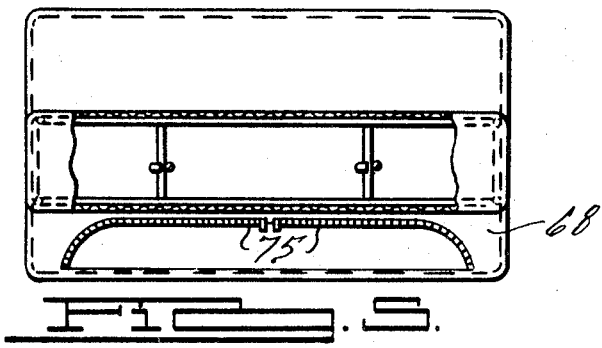
FIG. 5.
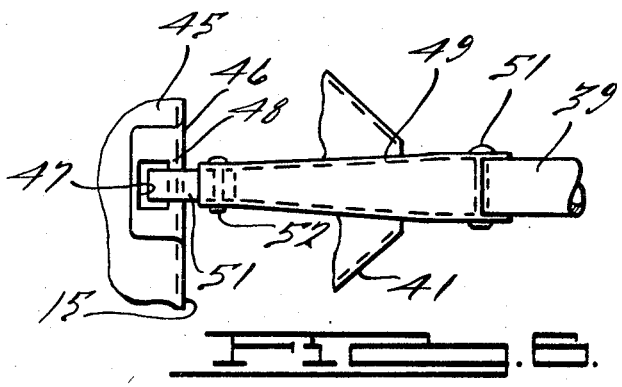
FIG. 6.
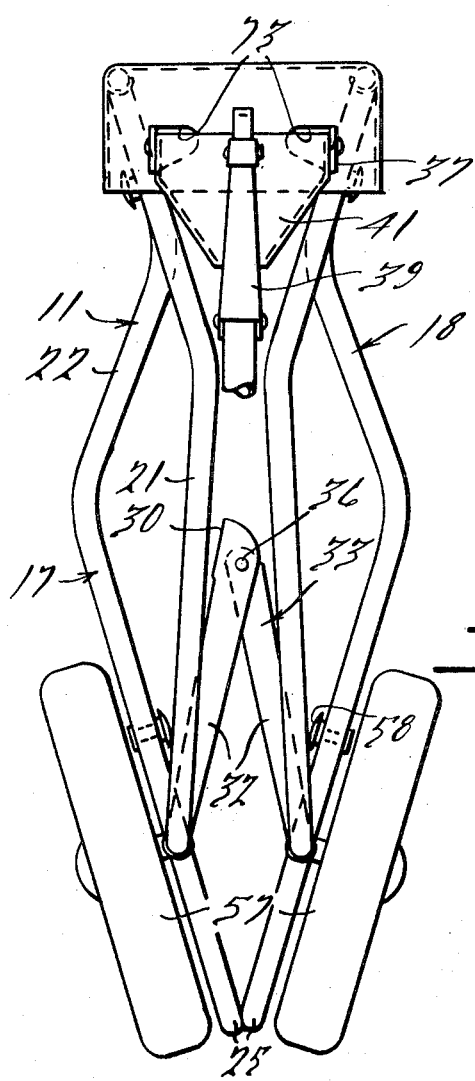
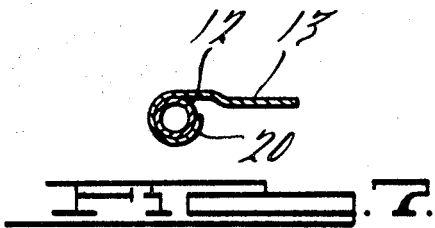
FIG. 7.
FIG. 8.
INVENTORS
Paul F. Seibold
Alfred H. Haberstump
BY
Harness, Dickey & Pierce
ATTORNEYS

GOLF CART

This application is a continuation of Ser. No. 10,488 filed 2,11,1970, now abandoned.

BACKGROUND OF THE INVENTION

Reference may be had to the O. W. Dawson Reissue Pat. No. 26,536 showing the initial concept of a golf cart over which the present cart is an improvement.

SUMMARY OF THE INVENTION

The invention pertains to a cart having a supporting frame at each side. Each frame is formed from a single tube which is joined together near the bottom front corner by a cylindrical bar which extends within the tube ends. The bar has an axle butt welded thereto to extend outwardly therefrom against which the tube ends abut. The top sections of the frames are placed within a seat of rectangular form, the side edges of which are rolled thereover to provide a hinge effect permitting the frames to pivot toward and away from each other. The front and rear portion of the seat extend downwardly and are provided with side flanges which form stop elements against which the upper portion of the vertical sections of the frame abut to provide rigidity thereto when the bottom sections are secured apart. The bottom sections are locked apart by hinged elements which are joined by a pivot which moves downwardly into overcenter relation to the ends which are pivoted on the bottom sections of the frames. The front downwardly extending portion of the seat has two ears lanced outwardly therefrom to form a support for a handle which swings downwardly against the two frames when moved to collapsed position. A link is secured to the handle spaced outwardly from the pivoted end and provided with a finger which extends into an aperture in the forward edge of the seat for locking the handle in raised pulling position.

The butt welded axles extend outwardly from the frames for supporting a pair of wheels which are secured on the axles by locking caps which retain the wheels on the shaft and provide a neat appearance for the hub portion of the wheel. The end of the handle curves downwardly and has a grip applied thereto. The wheels are more clearly illustrated and described in the copending application of P. F. Seibold, Ser. No. 813,567, filed Apr. 5, 1969, for "Spoked Wheel And Method of Construction", although any type of wheel known in the art to be suitable may be employed.

Golf carrying bags are releasably supported at each side of the cart having a keyhole slot on opposite sides, one disposed adjacent to the top open end, the other disposed adjacent to the bottom closed end. Headed studs are provided on the top outside face of the frames and at the bottom inside face of the frames. The heads receive the eye of the keyhole slot and support the bags at each side of the seat. With this arrangement, either bag may be mounted on either side of the cart.

A tote bag for transporting equipment, such as sweaters, balls, tees, and the like, is supported on the front downwardly extending portion of the seat secured by hooks which extend into the apertures left when the handle supporting ears were lanced therefrom. The tote bag is of sufficient width to engage the front vertical sections of the frames and prevent it from swinging forwardly when the cart is tilted. With this arrangement, the golf and tote bags can readily be removed from the cart, the handle can be released and swung downwardly and the two bottom sections of the frame moved inwardly to present a small package for transportation and storage.

BRIEF DESCRIPTION OF THE DRAWINGS

FIG. 1 is a view in elevation of a golf cart embodying features of the present invention;

FIG. 2 is a broken view in front elevation of a tote bag shown partially in section in FIG. 1;

FIG. 3 is a front view of the structure illustrated in FIG. 1;

FIG. 4 is an enlarged broken sectional view of the structure illustrated in FIG. 1, taken on the line 4—4 thereof;

FIG. 5 is an enlarged broken sectional view of the structure illustrated in FIG. 2, taken on the line 5—5 thereof;

FIG. 6 is an enlarged broken view of the structure illustrated in FIG. 1, as viewed from the line 6—6 thereof;

FIG. 7 is a broken sectional view of the structure illustrated in FIG. 1, taken on the line 7—7 thereof;

FIG. 8 is a view of the structure illustrated in FIG. 3 after the bags are removed and the frames moved to collapsed relationship, and FIG. 9 is a broken sectional view of the bottom portion of a frame showing the pivotal connection of the bracing element thereabout.

DESCRIPTION OF THE PREFERRED EMBODIMENTS

The foldable golf cart 11 has a seat 12 stamped from a sheet of metal with a depressed central portion 13 for strength and appearance. The seat has a downwardly deflected rear portion 14 and a downwardly deflected front portion 15. Flanges 16 are provided around the edges of the seat portion which are ironed smooth when the end portions 14 and 15 are formed at an angle. The side flanges of the seat are extended at 20 as illustrated in broken line in FIG. 1. The seat is supported on right and left-hand frames 17 and 18. The frames are formed from a length of tubing, preferably chrome plated steel tubing, to have a top section 19, a front section 21, a rear section 22 and a bottom section 23. The bottom section 23 has a substantially horizontal wheel supporting portion 24 and a U-shaped ground-engaging portion 25. The adjacent ends 26 and 27 of the tube have a solid stud 28 extending therein and secured in position in any suitable manner therein illustrated by rivets 29.

The tubular ends 26 and 27 abut against a stub axle 31 which had been butt welded to the stud 28 in the conventional manner. The axle extends at right angle to the bottom section in alignment with each other when the frames spread apart. Before the end 26 is assembled on the stud 28, sections 32 of a bracing element 33 of channel section have their outer ends rolled into a cylinder and slid over the ends 26 of the frames. After the rivets 29 are applied to the ends 26 and 27, a third rivet 34 through the tube end 26 and stud pivotally secures the cylindrical ends of the sections 32 thereto. The two sections 32 are secured together by a pivot 36 which moves below a line between the center of the stub axles 31 for locking the bottom sections 23 of the frames in separated position. The downward movement of the pivot 36 is limited by the offset portion 30 of the web of the outer section 32 of the bracing element.

When the cart is to be collapsed, the center of the bracing element 33 is moved upwardly to permit the wheels to swing inwardly to the position illustrated in FIG. 8. The sleeve ends of the sections 32 are confined between adjacent rivets 29 and 34 for pivotal movement on the ends 26 of the frames. When the wheels are moved outwardly and retained in spaced position, the upper end of the vertical sections 21 and 22 of the frames are stressed against the flanges 16 on the rear and front end portions 14 and 15 to provide a rigid relationship therewith. After the frames are constructed with the stub axles extending outwardly therefrom, the top sections 19 are placed within the seat 12 when inverted and the side flange extensions 20 are struck by a die and rolled over the top sections 19 of the frame to form a hinge relation therewith, as clearly illustrated in FIG. 7. This rolling can be done after the seat has had a coating of enamel applied thereto and cured in an oven with very little damage to the coating.

The front end portion 15 has two ears 37 lanced therefrom to extend outwardly at right angles to the front face thereof, as illustrated in FIGS. 1 and 2, with aligned apertures 38 provided therein. The tubular handle 39 is secured to a hinge plate 41 by suitable means herein illustrated as by rivets 42. The hinge plate has side flanges 43 to provide strength and also hingable portions having an aperture therethrough which are secured by rivets 44 to the ears 37 to have the handle swingable in a vertical plane at the front end of the cart. While the front and rear end portions 14 and 15 are joined to the seat central portion 13 on a curve 45, the center of the front portion 15 at the curve 45 is struck upwardly to have the central and front portions disposed substantially at right angle to each other as illustrated at 46 in FIGS. 1 and 6. This provides a platform in which an aperture 47 is stamped inwardly of the front portion 15 to have a flange 48 at the front of the aperture.

A channel shaped link 49 is secured by pivot 51 to the tubular handle 39, as clearly illustrated in FIG. 6. The free end of the link has a block 51 secured therein by rivets 52. A slot 53 extends in the forward end of the block 51 upwardly from the bottom thereof to form a finger 54 which extends within the aperture 47 at the front of the central seat portion 13. When the handle is raised to cart-hauling position, the finger 54 when dropped within the aperture 47 retains the handle in raised pulling position. It is only necessary to raise the link 49 sufficiently to withdraw the finger 54 from the aperture to release the handle and permit it to swing downwardly against the front of the frames, as illustrated in FIG. 1. The forward end 55 of the handle curves downwardly and is provided with a hand grip 56 which is slidable onto the straight projecting end portion thereof.

A wheel 57 is placed on each of the stub axles 31 and are secured thereon by a cap (not illustrated), having spring gripping fingers which resist the removal of the cap and wheel when forced over the stub axles 31. Any type of wheel known to be suitable may be employed but the one herein illustrated is that illustrated, described and claimed in the above mentioned copending application. The upper ends of the front frame sections 21 have securing elements provided on the outer face. The element has a head 58 with a shoulder 59 abutted against the section 21 with a body portion 61 extending therethrough and secured by a head 62, as more clearly illustrated in FIG. 4. A similar shouldered head is supported on the inner face of the lower portion of the rear section 22 of the frames. The heads 58 secure a pair of golf bags 63 to opposite sides of the seat in parallel relation to each other with the club receiving ends extending above the forward end of the seat. It will be noted that the lower portions of the rear sections 22 are disposed in parallel vertical planes and that the upper portions of the front sections 21 are likewise disposed in parallel vertical planes so that the inner and outer sides of the bags in engagement therewith will be parallel to each other and to a central plane through the cart. In this manner, the bags are supported in parallel relation and at such an angle that the clubs will project upwardly substantially parallel to the handle on each side thereof.

Opposite sides of the bag are provided with keyhole slots 64 and 65, the slot 65 is on the upper inner side of the bag, and the slot 64 if on the lower outer side of the bag. The eye of the slots receives the heads 58 after which the bags slide downwardly to be supported at the small end of the slot in removable but fixed relation to the frames. The narrow portion of the slot in the keyhole slot 64 is of greater length than that of the slot 65 so that its eye can be first placed over the head 58 and the bag slid downwardly a short distance to permit the eye of the keyhole slot 65 to be placed over the mating head 58 while the opposite end is secured. The bag is illustrated, described and claimed in the copending application of P. F. Seibold, Ser. No. 813,568, filed Apr. 4, 1969, for "Golf Bag", now U.S. Pat. No. 3,559,769.

The clubs are carried within the bag, half the clubs in one bag and the other half in the other bag. The bags will be carried separately within the trunk of an automobile along with the cart when in collapsed position, as illustrated in FIG. 8. When the cart is to be used, the wheels 57 are spread apart and secured by the bracing element 33 which locks the frame in pulling position. The handle 39 is then raised and the link 49 has its finger 54 moved into the aperture 47 to retain the handle in pulling position. The bags are then secured to opposite sides of the cart by the passing of the eyes of the keyhole slots 64 and 65 over the heads 58 on the frames. The cart is ready to be pulled with the clubs extending upwardly and readily accessible. The seat is available at all times at any place in the course when the cart is not being pulled. After playing the game, the bags are removed by sliding them forward and upwardly and releasing them from the heads 58. By raising upwardly on the central portion of the bracing element 33 and releasing the finger 54 from the aperture 47, the swinging of the frames and handle into nested relation collapses the cart.

A tote bag 67 of conventional form has a rectangular bulbous body portion 68 which is supported on a wire frame 69 and suspended from a pair of wires 71 having hook ends 72 which engage the bottom wall of openings 73 remaining after the ears 37 were lanced from the front end 15 of the seat. The bag is of sufficient width to bump against the front sections 21 of the frames when the cart is tilted forwardly to prevent the bag from swinging as the cart is being pulled. The bag may take any form, the one herein illustrated having a pair of zippers 75 which releases a flap to permit sweaters or other wearing apparel to be placed in the bottom of the bag. Pockets 76 may be secured on the rear and side walls for supporting tees, golf balls and other elements to be transported. It is only necessary to secure the hook ends 72 over the edge of the openings 73 as clearly illustrated in FIG. 2, to support the bag on the cart. By removing the hooks 72 from the edges of the openings 73 the tote bag 67 is removed before the frame is collapsed.

I claim:

1. In a golf cart, a pair of tubular frames, a seating member having a top with pairs of opposite side flanges and end flanges, means for pivotally mounting the frames to said pair of opposite flanges of the seating member to form a support therefor, a wheel pivoted to each frame at the bottom thereof, bag securing means near the top of the front and near the bottom of the rear of said frames, said securing means near the top being on the outer face of the frame and the securing means near the bottom being on the inner face of the frames, the front top portions of the frames having the bag securing means thereon being closer together than the rear portions of the frames having the bag securing means thereon, and a pair of golf bags having means on opposite sides thereof which engage the securing means in such a manner that either bag may be supported in a substantially parallel relationship to each other on either of the frames and extend forwardly thereof.

2. In a golf cart as recited in claim 1, wherein the securing means is a headed stud and wherein the engaging means on the golf bag are keyhole slots.

3. In a golf bag as recited in claim 2, wherein the frames have sections at the top, sides and bottom and wherein the lower portion of the rear side sections of the frames and the upper portion of the front side sections of the frames are in parallel planes and disposed in offset relation to each other the thickness of the bag so as to have the bags disposed in parallel relation to each other.

4. In a golf cart as recited in claim 3, wherein the open end of the bag extends forwardly and above the seating member.

5. In a golf cart as recited in claim 1, wherein said pair of tubular frames each has a top section, two side sections and a bottom section, said side flanges encompassing the top section of the frames forming a hinged relation therewith, and a wheel pivoted on each said bottom section.

6. In a golf cart as recited in claim 5, wherein the side flanges of the seating member beyond the encompassing portions are engaged by the upper portions of the two side sections of the frames when the wheels are in spread-apart relationship for rigidly bracing the seat member and the frames.

7. In a golf cart as recited in claim 6, wherein the front flange of the seating member has a pair of lanced-out ears extending outwardly thereof, a tubular handle having hinge means at the end, and pivot means securing said hinge means between said ears.

8. In a golf cart as recited in claim 7, wherein a link is pivoted to the handle adjacent to the hinge means having a finger thereon, and wherein the front top of the seat has an aperture therein inwardly of the front flange into which the finger extends when the handle is in raised pulling position for retaining the handle in said position.

9. In a golf cart as recited in claim 7, wherein a tote bag suspended on a pair of hangers having hooks on the outer ends is supported on the front flange when the hooks engage the wall of the aperture from which the ears were lanced, the bag being disposed in the rear of the front side sections of the front frame and being of greater width than the space therebetween so as to be retained thereby against forward swinging movement.

* * * * *